United States Patent [19]

Ihmels et al.

[11] Patent Number: 4,811,904

[45] Date of Patent: Mar. 14, 1989

[54] SPRAY MEDIUM INSET FOR SPRAYING PISTOLS AND A SPRAYING PISTOL SUITABLE FOR APPLICATION OF SUCH INSETS

[76] Inventors: Manfred Ihmels, Lajestrasse 1a; Hartmut Ihmels, Hauptstrasse 23, both of 2905 Edewecht, Fed. Rep. of Germany

[21] Appl. No.: 680,006

[22] Filed: Dec. 10, 1984

Related U.S. Application Data

[63] Continuation of Ser. No. 336,386, Dec. 28, 1981, Pat. No. 4,562,965.

[30] Foreign Application Priority Data

Dec. 21, 1983 [DE] Fed. Rep. of Germany ....... 3346165

[51] Int. Cl.[4] ........................ B05B 7/30; A01G 25/14; A62C 31/02

[52] U.S. Cl. .................................... 239/345; 239/346; 239/378; 239/391; 239/397

[58] Field of Search ................. 239/85, 304, 340, 345, 239/346, 378, 390, 391, 397; 366/279, 325, 328, 331, 342, 343, 241; 206/223, 229, 568

[56] References Cited

U.S. PATENT DOCUMENTS

| | | | |
|---|---|---|---|
| 2,196,800 | 4/1940 | Krautzberger | 239/345 X |
| 2,263,842 | 11/1941 | Gross | 239/340 X |
| 3,074,651 | 1/1963 | Agosti et al. | 239/304 |
| 3,207,377 | 9/1965 | Lemelson | 222/130 |
| 3,436,058 | 4/1969 | Murphy | 366/241 |
| 3,603,564 | 9/1971 | Price et al. | 366/279 X |
| 4,407,584 | 10/1983 | Boudin et al. | 366/279 |

FOREIGN PATENT DOCUMENTS 713553 11/1941 Fed. Rep. of Germany ...... 239/345

OTHER PUBLICATIONS

J. C. Whitney & Co. Catalog No. 424b © 1982, p. 140, (Note "Lightweight Auto Body Filler" listed @ lower right).

*Primary Examiner*—Andres Kashnikow
*Assistant Examiner*—Patrick N. Burkhart
*Attorney, Agent, or Firm*—Charles Hieken

[57] ABSTRACT

A spray medium inset for a spraying pistol includes a spraying nozzle, and a needle for selectively closing the nozzle spray opening. The inset includes a connecting channel terminating in a cylindrical recess having an annular recess in the wall surrounding the cylindrical recess that snugly accommodates an annular ridge around the opening of a spray medium tank detachably secured to the connecting channel in the cylindrical recess. The connecting channel also includes a plug for normally keeping the spray opening closed with the jet needle. The tank has a concave bottom supporting a mixing shaft in a claw plug with a frangible annular zipper zone around the shaft. The mixing shaft is formed with a plug that engages a seat in the connecting channel bolt member that keeps the connecting channel closed and the spray opening closed with the shaft in its original extended position. A portion of the mixing shaft extends outside the concave bottom to function as a handle and extends into a hardener compartment containing hardener covered by a removable cover.

3 Claims, 9 Drawing Sheets

Fig. 11
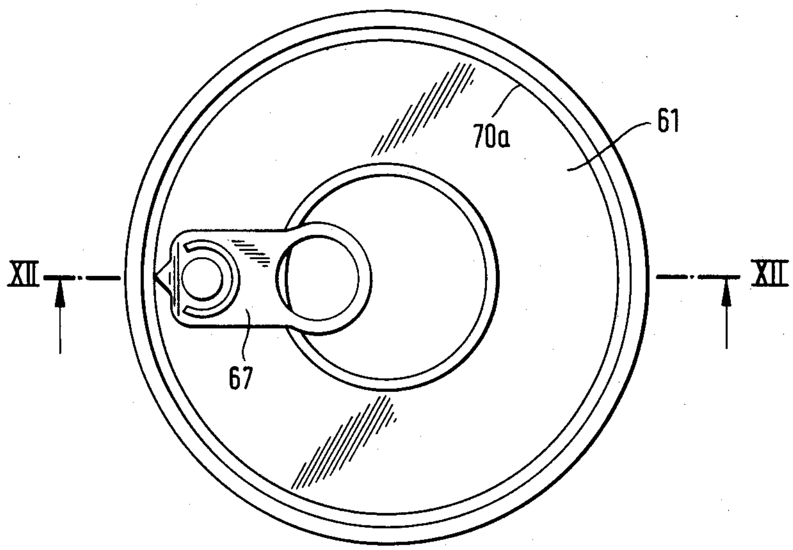
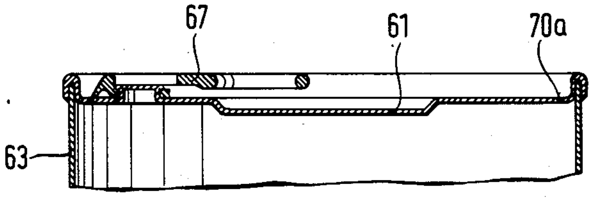
Fig. 12

SPRAY MEDIUM INSET FOR SPRAYING PISTOLS AND A SPRAYING PISTOL SUITABLE FOR APPLICATION OF SUCH INSETS

This application is a continuation-in-part of application Ser. No. 06/336,386 filed on Dec. 28, 1981, now U.S. Pat. No. 4,562,965 issued Jan. 7, 1986.

HEADING

The present invention relates to a spray medium inset for spraying pistols and a spraying pistol suitable for application of such insets, especially for applying hardening fluids onto surfaces.

STATE OF ART

In modern spraying pistols the nozzle ejecting the spray substance is an integral part of the body of the pistol and the body is provided with a threaded pipe for screw connection of a tank filled with spray substance (DE-B No. 1 047 079, DE No. 1 014 889, DE No. 2 412 743, U.S. Pat. No. 3,286,459). Plastics as spray substance for a quick hardening after spraying are intensively mixed immediately before spraying with a hardening agent. After operation the pistol as well as the tank must be cleaned thoroughly to hinder contamination and occlusion by hardening of the spraying substance. This work is tedious and time-consuming. Furthermore essential difficulties result from slovenly cleaning.

In DE No. 21 29 39 a spraying pistol is shown, which has been constructed to insert alternately different paint tanks with combined spraying nozzle and operating mechanism except the handle of the pistol into a socket seat of the body of the pistol. These spraying pistols have proved a success where it is important to produce multicolored ornaments or pictures by rapid replacement of paint tanks during production of such multicolored pictures. However, on account of expenditure of operating mechanism this construction is out of question where after consumption of its contents merely a new charge of spraying substance is required. For this purpose it is better customarily to refill the tank with spraying substance held ready for continuation of application.

Thus, the problem of cleaning isn't resolved by any one of said known spraying pistols.

In order to provide a spraying pistol, the application of which is not loaded with pollution, which makes necessary time-consuming cleaning, the applicant has developed a pistol in which all parts which during operation are wetted with spraying medium form an exchangeable spray medium inset which is insertable into a seat of the pistol body and is locked by the breech block (DE-OS No. 3 016 419).

In these spray medium insets for spraying pistols the tank for the spraying medium and the spray nozzle together with a connecting channel form a one-piece body. This is disadvantageous for the manufacturer and the distributor of the insets filled with the spraying medium. Special and complicated devices are necessary for the transport along the lines for filling up, closing and packing the tank-unit.

PROBLEM

It is an object of the present invention to provide a spray medium inset and spray pistol which overcome or at least mitigate the above mentioned problems.

SOLUTION OF THE PROBLEM

To solve the above problems, the medium tank forms an exchangeable part insertable into a tight seat at the inlet of the medium channel. Thereby the medium tank can be a usual cylindrical can having for instance a diameter of 84 mm and a height of 130 mm as is conventional for paintpackages.

All parts of the pistol, which are wetted with spraying substance after operation, should be replaced by new parts which preferably should be made so simple and inexpensive that the expense for their replacement is less than the expense for cleaning. For this purpose the spray nozzle and connecting channel together with the seat for the tank at the inlet of the connecting channel inventively from an exchangeable foot-like body insertable into a slipper-like seat within the pistol-body. Such an independent second inset may be used during a longer essentially uninterrupted operation and consumption of a lot of medium tanks thereby minimizing the expense for replacement on the whole.

Said foot-like second inset preferably is provided with a funnel-shaped upper part or bowl to be turned upside down over the opened tank, after having given the correct dose of hardening substance into the open tank and having mixed both thoroughly. Such correct dose of hardening substance may be added within a separate small chamber of the tank as for instance a cap fixed at the bottom of the tank.

Preferably said foot-like inset is made of synthetic material, whereas the tank may be made of other, as for instance metallic material.

The needle of the spray nozzle may be blocked in its closed position for instance by a bolt or pawl so that the nozzle merely is opened after insertion and during operation.

Stated in other words, a spray medium inset for a spraying pistol according to the invention comprises a spray nozzle with a spray opening, a needle for selectively closing the spray opening, a cylindrical tank detachably secured to the connecting channel and formed with an annular lip around a medium opening normally sealed by a first removable cover and having at least a medium chamber accessible through the medium opening for holding spray medium, and means defining a connecting channel for connecting the tank to the nozzle formed with a cylindrical recess having an inside annular recess extending into a wall surrounding the cylindrical recess for engaging the annular lip of the tank. Upon removal of the first cover, the cylindrical tank may be inserted into the cylindrical recess with the annular lip snugly seated in the annular recess.

Preferably, the spraying pistol has a body with a slipper-like seat, and the spray nozzle and connecting channel form an exchangeable foot-like body detachably secured to the spraying pistol body with the slipper-like seat comprising means for receiving the exchangeable foot-like body. Preferably the foot-like body and connecting channel comprise a funnel-shaped port comprising the cylindrical recess and the annular recess for being arranged with the opening of the cylindrical recess over the uncovered opening of the tank. Preferably, the tank also includes a small hardening means chamber separated from the medium chamber for holding hardening means for being introduced into the spray medium before application with a second cover for covering the small hardening means chamber. The second cover preferably comprises a cap over the small hardening means chamber with a tube of the hardening means inside the small hardening means chamber. Preferably the foot-like body is made of synthetic material, and the tank is made of metallic material, typically having a diameter of the order of 84 mm and a height of the order of 130 mm.

Preferably there is mixing means for mixing the spray medium comprising a shaft supported in the bottom of the tank and extending predominantly inside the medium chamber. Preferably, there is flange means for interconnecting the shaft and the bottom of the tank, the bottom of the tank preferably being concave and the flange means formed with a breakable zipper zone. Preferably the flange means comprises an elastic claw plug, and the shaft extends outside the tank bottom to form a handle for mixing.

Preferably there is plug means for selectively closing the connecting channel, and means for interconnecting the plug means and the shaft for closing the connecting channel when the shaft is in an extended position. Preferably, the bottom has a shaft annular recess surrounding the shaft, and the shaft is formed with a bulge for sealing the shaft annular recess when the shaft is in a withdrawn position.

Preferably, there is bolt means for blocking the needle in a closed position closing the spray opening. There may be means for supporting the bolt means in the connecting channel. The needle may be formed with a groove for engagement with the bolt means. The bolt means may comprise a barb. The bolt means may comprise a projection for engagement by the slipper-shaped seat during insertion of the inset. Alternatively, the bolt means may comprise a projection for engagement by a breach block of the spraying pistol.

The means defining a cylindrical recess, the nozzle, the jet needle and the connecting channel means form an exchangeable unit detachably secured to the pistol body. The connecting channel means may have a seat end enlarged to form a bowl comprising the cylindrical recess, or may have a seat end comprising a hollow plug for snug engagement with an opened tank. The cylindrical recess may be arranged above the nozzle, or below the nozzle with means defining a suction pipe tightly connected to the connecting channel.

Numerous other features, objects and advantages of the invention will become apparent from the following description when read in connection with the accompanying drawing.

DESCRIPTION OF EMBODIMENTS

Figure 1:
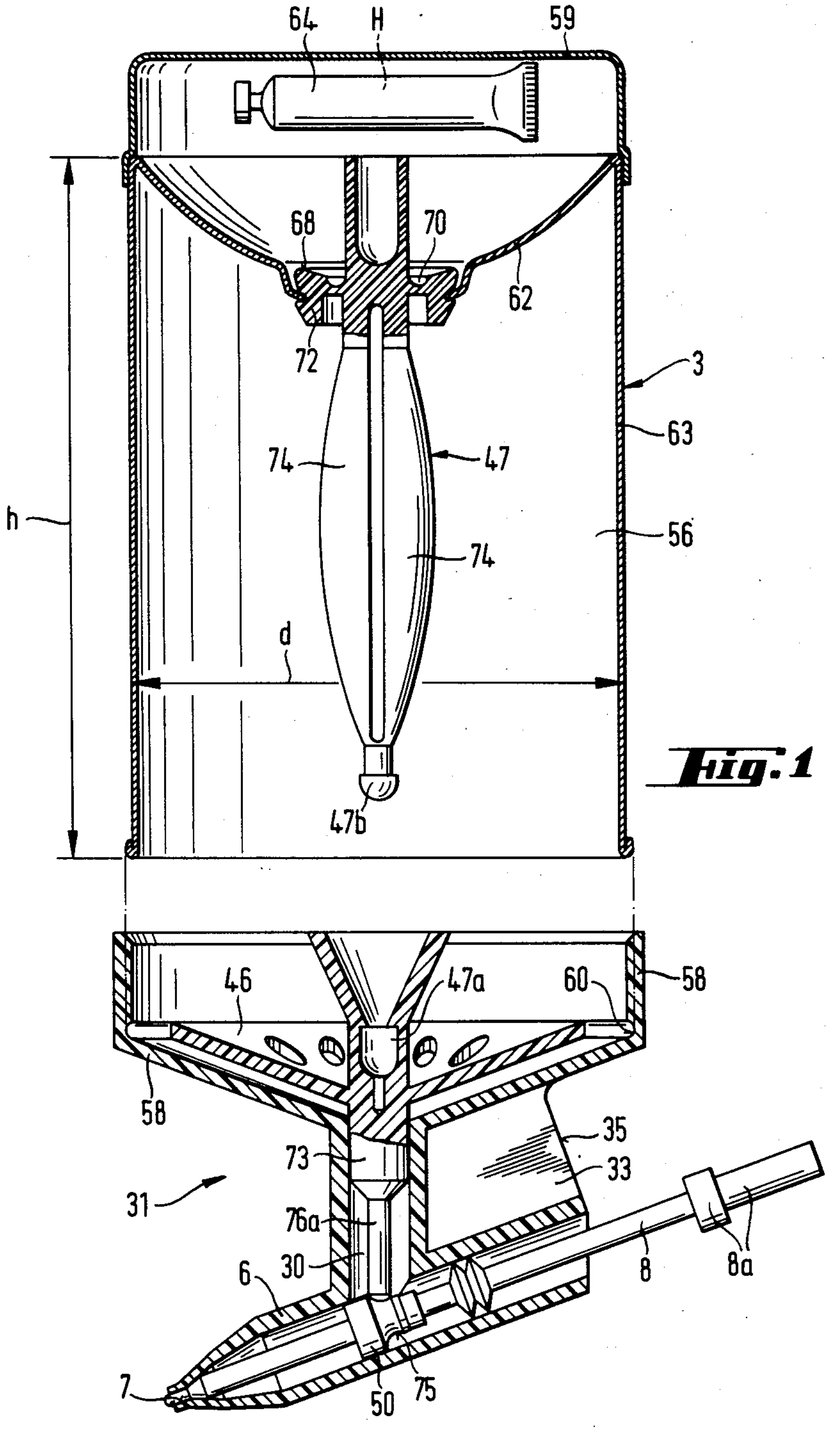
Figure 2:
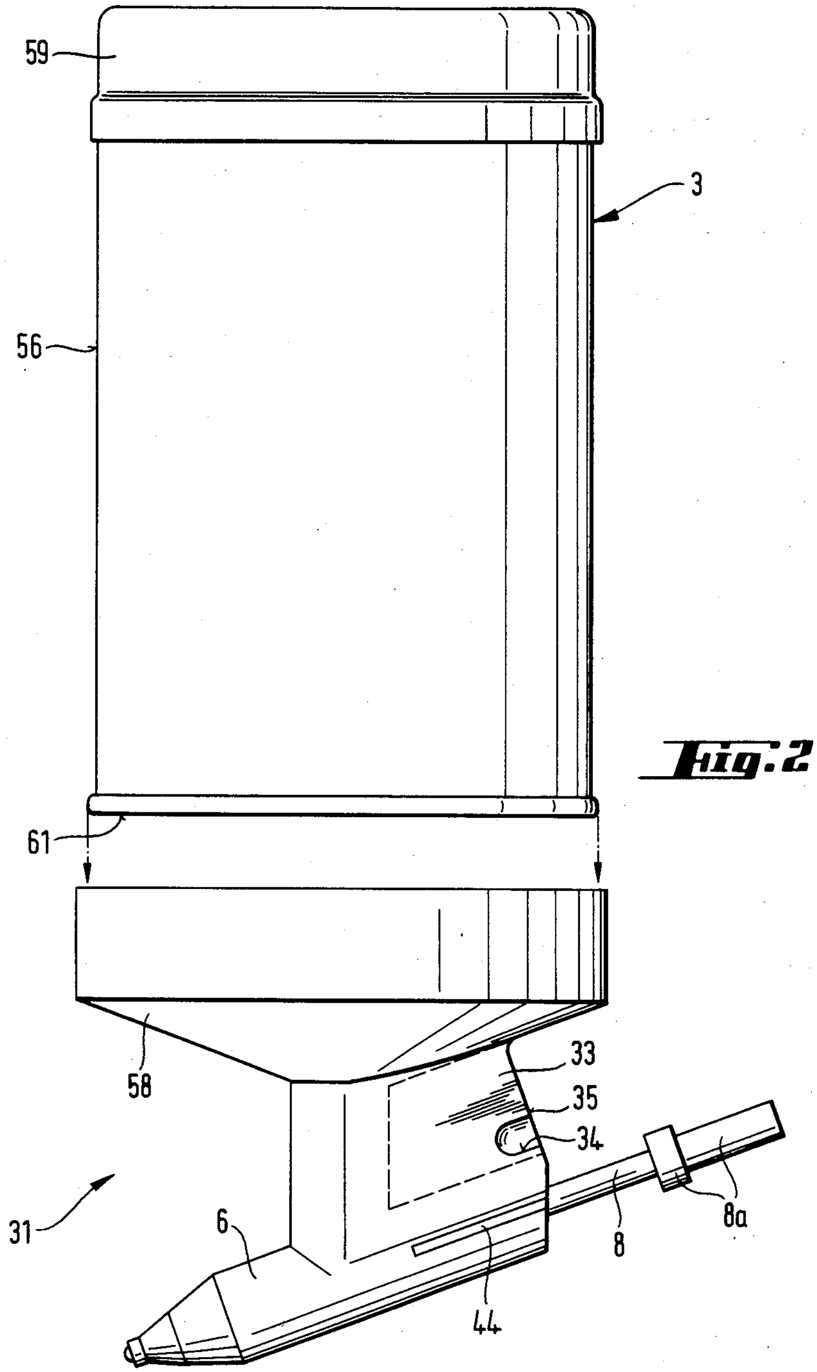
Figure 3:
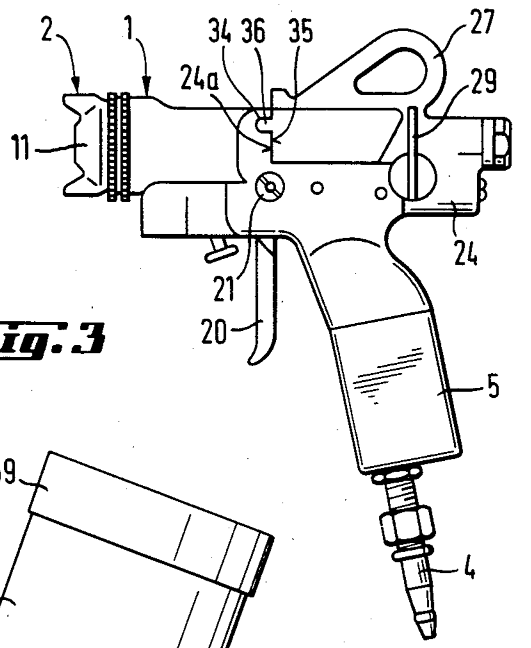
Figure 4:
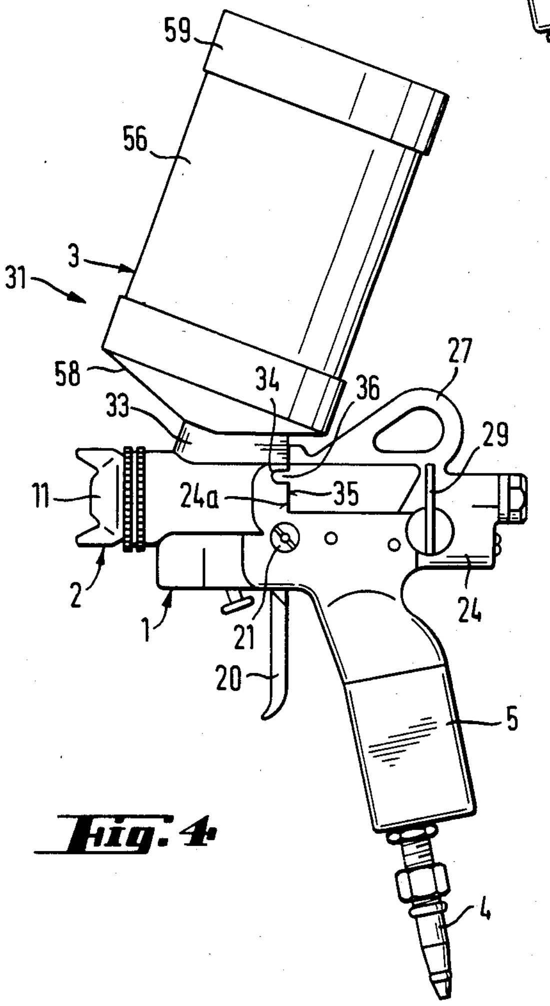
Figure 5:
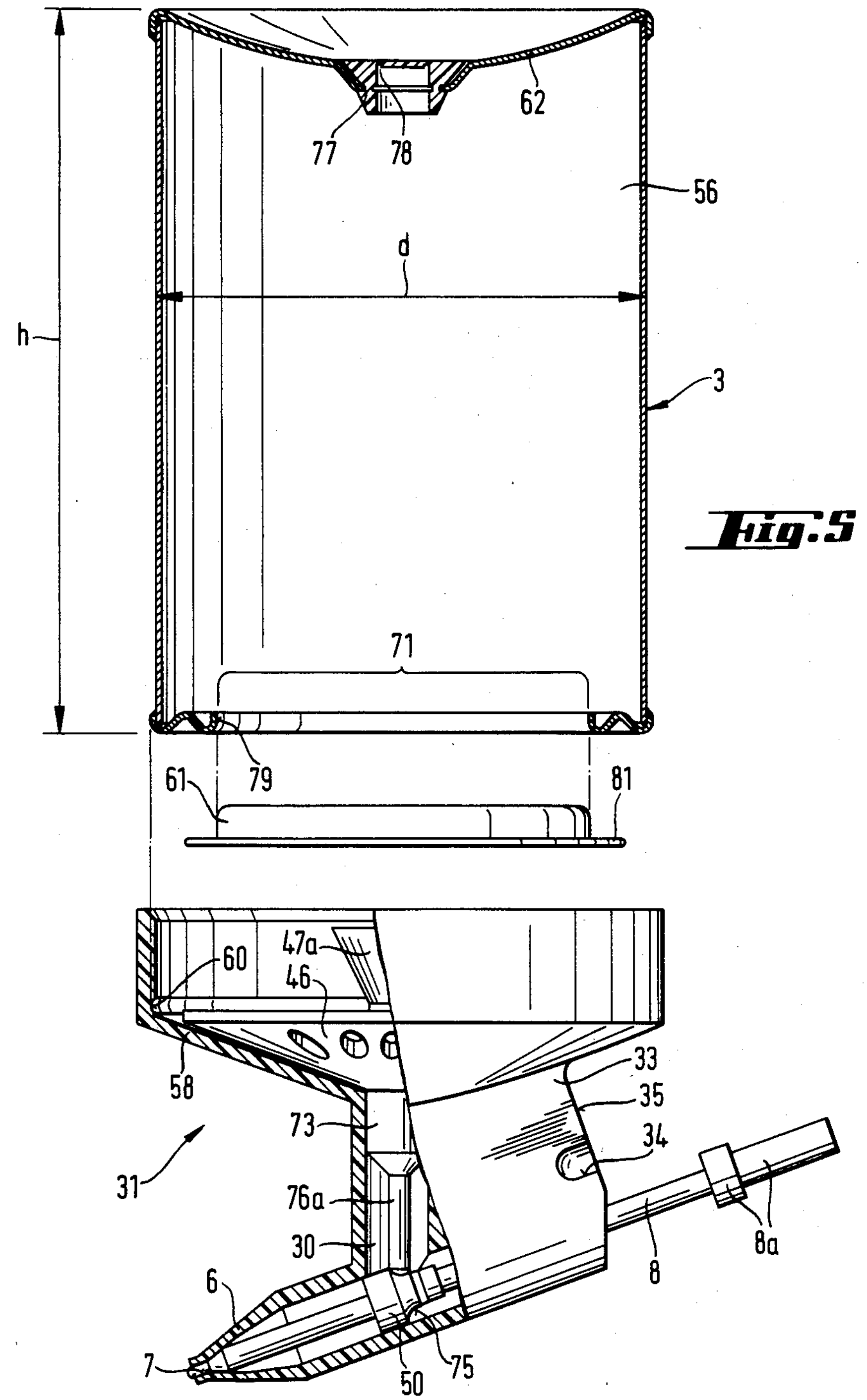
Figure 6:
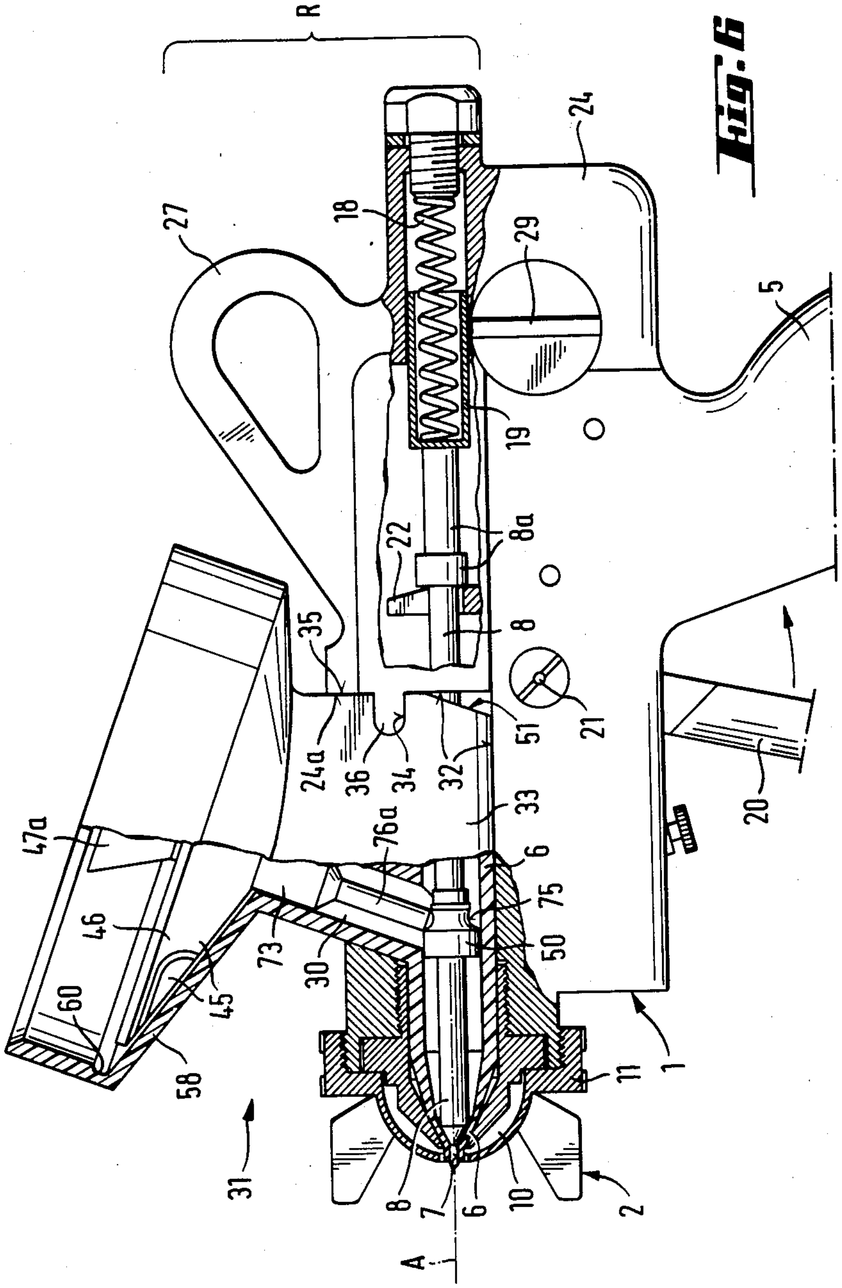
Figure 7:
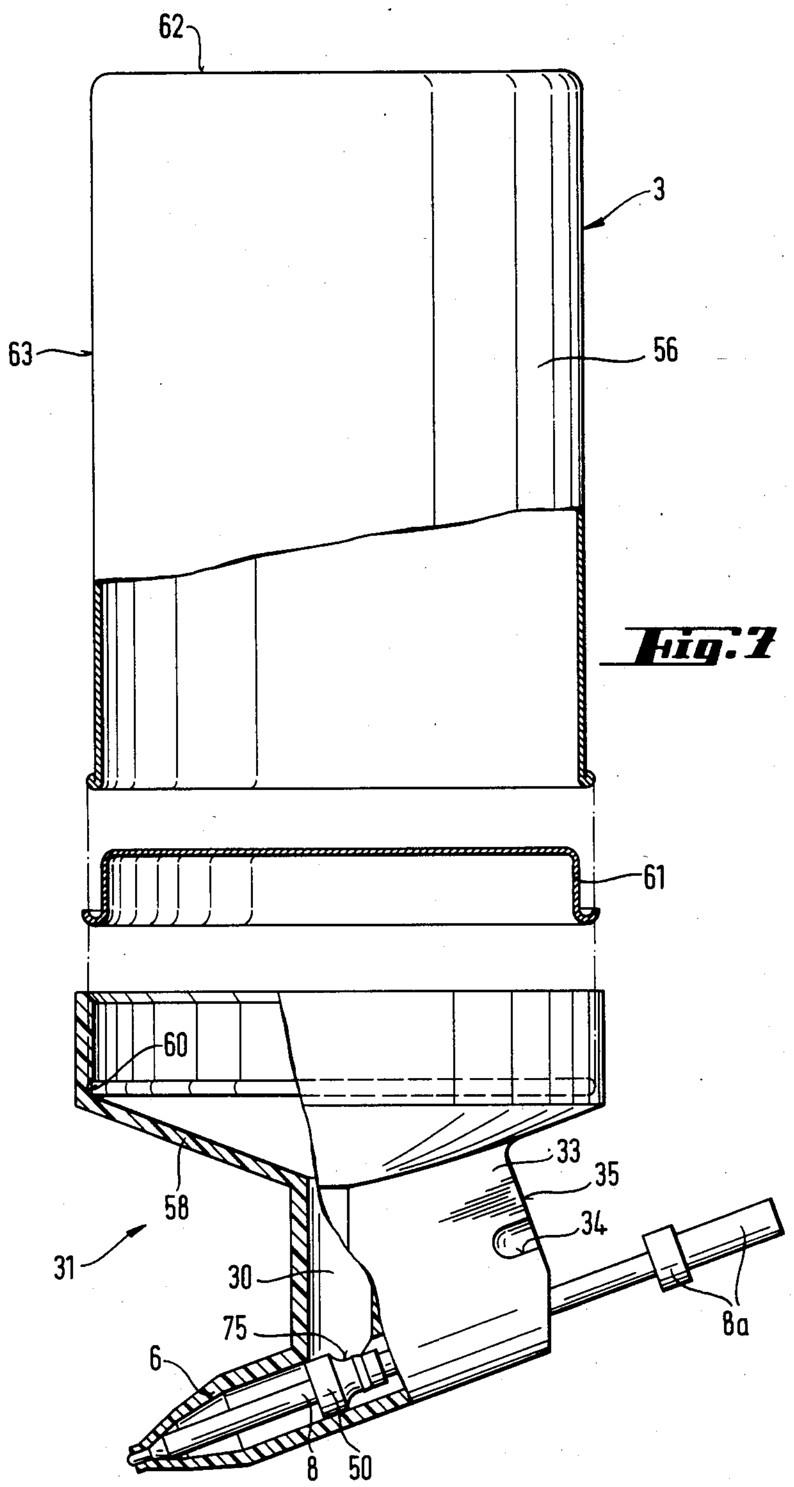
Figure 8:
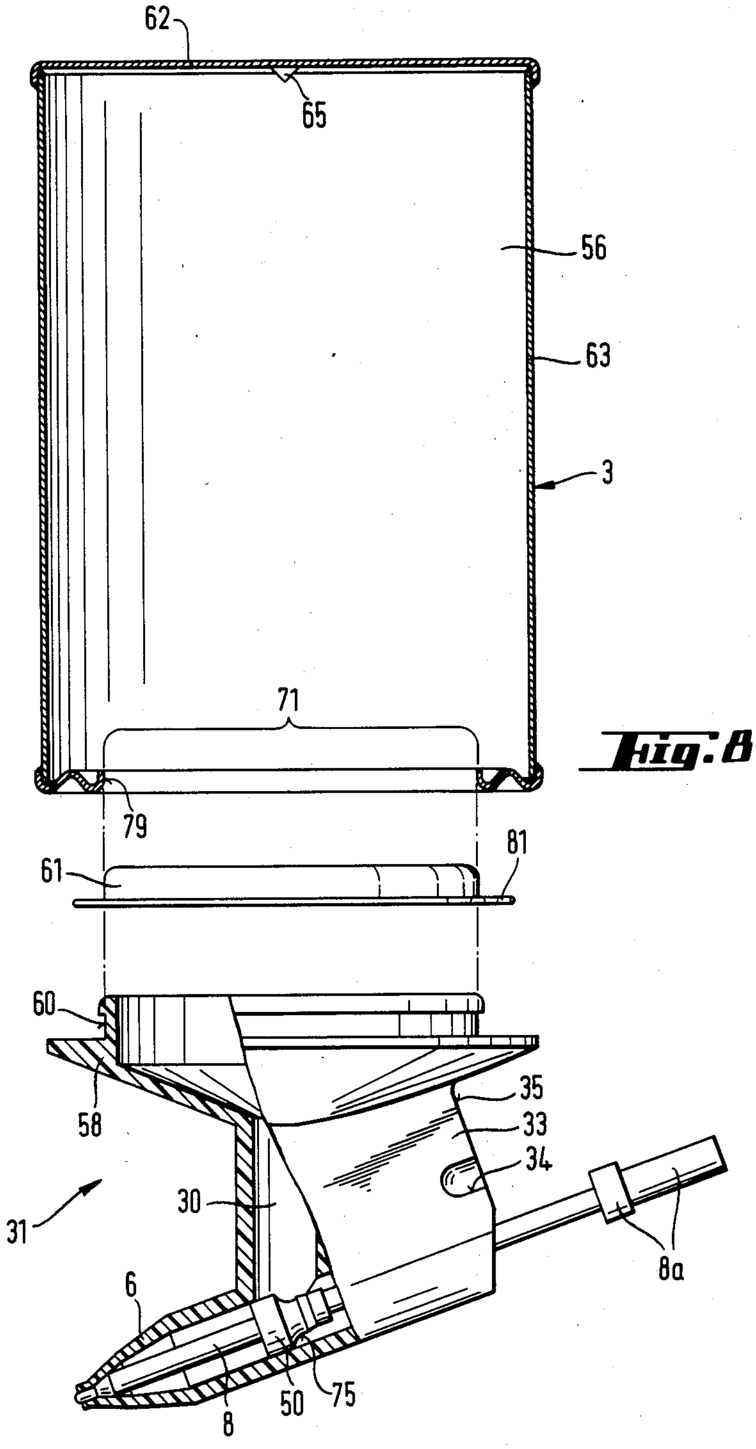
Figure 9:
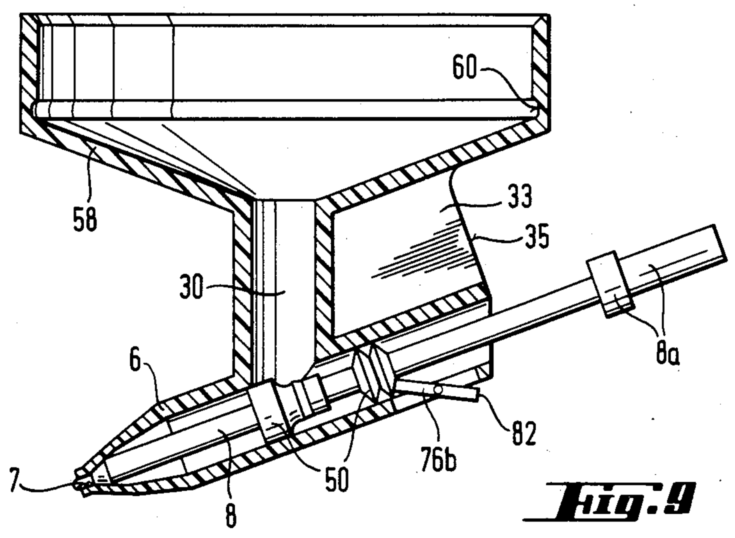
Figure 10:
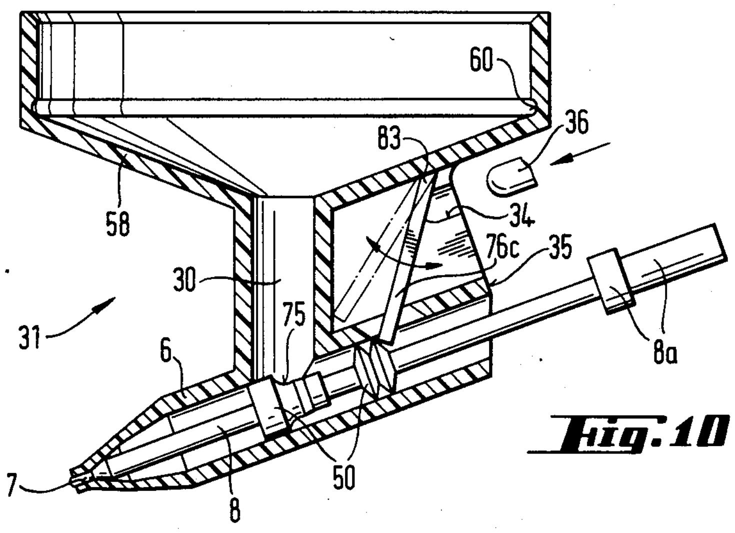

For a better understanding of the present invention, and to show how the same may be put into effect, reference will now be made by way of example to the accompanying drawings, in which:

FIG. 1 is a mostly sectional side view of a spray medium inset with its two parts yet separated, FIG. 2 is a side view of the inset in FIG. 1, FIG. 3 ~~is~~ a side view of a spraying pistol suitable for application in connection with insets as are shown in FIGS. 1 and 2 or the following figures, FIG. 4 is a side view of the pistol with inserted inset, FIG. 5 is a sectional view of another inset-embodiment, FIG. 6 is a partially sectional side view of a spraying pistol with a foot-part of the inset, FIGS. 7,8 are further embodiments of the inset, FIGS. 9,10 are further embodiments showing means for clocking the spray needle, and FIGS. 11,12 are showing a tank cover with ring zipper in plan.

The spraying pistol and spray medium insets shown in the drawing are modifications and improvements of the spraying pistol and spray medium insets as are shown in the German application DE-OS No. 3 016 419 of the applicant. In order to facilitate the comparison of the present and former embodiments, the same reference numbers are used for corresponding parts.

The spraying pistol shown in the drawing serves for application of hardening fluids (spraying substances) and especially a mixture of plastics and a hardening agent onto surfaces with a spraying nozzle 6 which is connected to a tank 3 for the spraying substance. It consists essentially of a pistol body 1 with a spraying head 2 which is connected to the tank for the spraying substance and is connectable to a compressed-air source by a feed pipe 4.

The spraying head 2—see especilly FIG. 3,4 and 6—includes the nozzle 6, the jet orifice 7 of which in a state of rest is closed by the tip of a nozzle needle 8 and is opened by drawing backward said needle. Within the body 1 channels are provided which join a distribution chamber 10 surrounding the front end of nozzle 6. This chamber 10 is formed by the front surface of body 1 and a screw cap 11 having a central bore forming an annular opening to produce a concentrical atomizing ray for the enclosed central jet of spraying substance. The circular spraying jet may be shaped to a flat-section jet with more or less extension within a plane vertically to the drawing plane and adjustable inclination to the plane of symmetry. For this the spray cap 11 is provided with auxilliary channels directed from opposite sides towards the circular jet from the nozzle.

A closing spring 18 presses a bolt 19 against the head 8*a* at the backside of jet needle 8. By operating a pull-off, consisting of a handle 20, which in direction of arrow is swivable around an axle 21 and is coupled with a fork 22, jet needle 8 may be retracted against spring 18 thereby, opening the jet orifice 7.

By operating pull-off 20/22 a needle valve within the channel from feed pipe to the spraying head is opened, preferably with a certain lead time so that the compressed-air stream begins even before opening of nozzle 6.

Closing spring 18 and bolt 19 are arranged within a separate part 24 of the pistol, which part generally is named a breech-block. After having loosened a locking mechanism with tensioning lever 29 said breech-block 24, which is provided with a handle 27, can be retracted backwards a limited distance from the fore part pistol-body 1 along a rod. After having been retracted said breech-block can be folded down around said rod. Then jet needle 8 could—as known hitherto—be drawn out of the jet nozzle 6. (This however, is not made use of in connection with the new pistol according to the invention as will become clear from the following description). In operating position breech-block 24 is pressed with its front side 24*a* against the backside of body 1 and is secured by guide pins engaging holes of body 1.

The construction described so far is in conformity with the conventional construction of modern spraying pistols as are shown for instance in DE No. 2 412 743.

Unlike conventional construction the entirety of all parts encasing and guiding the spraying substance form an integrated enveloping body forming an easily replacable inset 31 consisting of tank 3, nozzle 6 with jet needle 8 and a bridge 33 with connecting channel 30 between tank 3 and nozzle 6.

Body 1 is provided with a slipper-shaped seat 32 for insertion of inset 31 and the connection or bridge 33 between tank 3 and nozzle together with nozzle 6 are formed like a foot with the underside as a sole and its backside as a heel 35 fit to the seat 32. Borehole 34 already mentioned above and for reception of pin 36 on breech-block 24 arranged in the backside of the pistol, body in conventional pistols here is arranged in the heel 35 of inset 32 in order to ensure the inset 32 within its seat 32.

The jet needle 8 is fixedly connected to the nozzle and is retractable by operation of handle 20. After the contents of tank 3 has been consumed the whole insert is ejected.

Spraying nozzle 6, and connecting bridge 33 form a one-piece inset able like a foot into a slipper.

The tank 3 contains a large chamber for plastics and a small chamber 59 for the hardening agent H which must be brought into the plastics.

For mixing together the plastics and hardening agent the tank contains a mixer consisting of a perforated disk 46 with a shaft 47 and a cuppling for a handle.

The nozzle needle 8 is provided with a piston 50 selaing the rear of the nozzle chamber and holding closed the nozzle against the connecting passage 30 to tank 3 during rest position.

The medium tank 3 is a usual cylindrical can with cover 61 and bottom 62. This tank filled with the paint substance (without hardening agent) is inserted into tight seat 60. Foot 6/33 with connecting channel 30 form a first inset and tank 3 a second inset insertable into said seat 60 at the inlet of connecting channel 30. Inset 6/33 at said inlet is provided with funnel-shaped upper-part 50, which for operation is turned upside down over tank 3 opened by removing its cover 61 (turn FIG. 1 upside down). Inset 6/33 preferably is made of plastics or other synthetic material; tank 3 may be of metallic material and may have a cap-like cover 59 forming a small chamber for reception of tube 64 with the dose of hardening agent. The hardening agent is brought in after removing cover 59 and cover 61 and distributed by mixer with shaft 47 and perforated disc 46. The shaft 47 is connected by a flange 68 to bottom 67 of tank 3 and can be loosened by cracking a frangible zipper zone 70. Flange 68 is fixed within the bottom 62 with an elastic claw plug 72. The outer end of shaft 47 is connectable to a handle not shown in the drawing.

The mixer shaft 47 is divided. Its upper part is integrated in tank 3 and the lower part in the funnel-like bowl 58 at the inlet of connecting channel 30. Both parts 47*a* and 47*b* of shaft 47 are connected like a plug and socket.

During the mixing procedure flow of medium to nozzle 6 is hindered by a plug 73 closing the inlet. After mixing procedure the mixer is drawn upside and is jammed by a bulge 74 which is permeable to air so that the medium can be sucked through connecting channel 30 to be sprayed out through nozzle 6.

The bottom 62 is formed concave so that no parts are projecting above the upper plane of tank 3.

In mixer operation after tank 3 is inserted into seat 60 of foot 33, the upper part of shaft 47 extending above bottom 62 may be pushed downward toward foot 33 to break zipper zone 70 and break the connection between shaft 47 and flange 68 of claw plug 72. This downward pushing of shaft 47 causes the depending plug 47*b* to snap into seat 47*a* of of perforated disk 44 to interconnect shaft 47 and disk 46. The operator may then grasp the upper end of shaft 47 and move it up and down to correspondingly oscillate perforated disk 46 and effect mixing.

Shaft 47 has a bulge 74 shaped generally like an egg or football for clamping shaft 47 in a pulled-out position when force-fit in claw plug 68, thereby preventing plug 73 and bolt 76 of disk 46 from sealing connecting channel 30 during spraying.

Other embodiments of the insets are shown in FIGS. 7 to 12.

The embodiment of FIG. 5 has a mixer with separate shaft (not shown in the drawing), which must be pushed through a lead-in-body 77 with zipper 78. The tanks could have an undulated inner flange 79 with opening 71 and a hollow plug cover 61 with flange 81 as is known per se and is shown in FIG. 8. Funnel 58 is provided with an appropriate seat 60.

FIGS. 5, 9 and 10 showing means for blocking needle 8 of nozzle 6 in its closed rest-position as for instance by a bolt 76*a* (FIG. 5), provided at the underside of mixer 46 and engaging a groove 75 of needle 8. In FIG. 9 the bolt 76*b* is connected to a lever 82 projecting the outside of nozzle end engaged by the slipper-shaped seat 32 within pistol body 1 during insertion of inset 31. In FIG. 10 a bolt 76*c* is arranged at a lever-like projection 83 which for release of needle 8 is engaged by pin 36 of breech-block 24.

FIG. 7 shows an embodiment without mixer. Mixing may be done by help of separated means, if mixing is necessary. Paints without hardening agent could be brought out by a pistol with nozzle 6 and connecting channel integrated in pistol body 1 with tin 3 as sole inset.

While in accordance with the provisions of the statutes there is illustrated and described herein the best form and mode of operation of the invention now known to the inventor, those skilled in the art will understand that changes may be made in the form disclosed without departing from the spirit of the invention covered by the claims, and that certain features of the invention may sometimes be used to advantage without a corresponding use of other features. Thus, tanks with other forms of cover and bottom could be used as for instance tank-covers 61 provided with a ring-zipper 67 (FIG. 11,12).

We claim:

1. A spray medium inset for a spraying pistol comprising, a spray nozzle with a spray opening, a needle for selectively closing spray opening, a connecting channel, a cylindrical tank detachably secured to said connecting channel and formed with an annular lip around a medium opening normally sealed by a first removable cover opposite a tank bottom and having at least a medium chamber accessible through said medium opening for holding spray medium, means defining said connecting channel for connecting said tank to said nozzle and formed with a cylindrical recess having an inside annular recess extending into a wall surrounding said cylindrical recess for snugly engaging said annular lip, whereby upon removal of said first cover said cylindrical tank may be inserted into said cylindrical recess with said annular lip snugly seated in said annular recess, mixing means for mixing said spray medium, said mixing means comprising a shaft supported in the bottom of said tank and extending predominantly inside said medium chamber, flange means for interconnecting said shaft and the bottom of said tank, wherein the bottom of said tank is concave and said flange means is formed with a frangible zipper zone.

2. A spray medium inset for a spraying pistol comprising, a spray nozzle with a spray opening, a needle for selectively closing said spray opening, a connecting channel, a cylindrical tank detachably secured to said connecting channel and formed with an annular lip around a medium opening normally sealed by a first removable cover opposite a tank bottom and having at least a medium chamber accessible through said medium opening for holding spray medium, means defining said connecting channel for connecting said tank to said nozzle and formed with a cylindrical recess having an inside annular recess extending into a wall surrounding said cylindrical recess for snugly engaging said annular lip, whereby upon removal of said first cover said cylindrical tank may be inserted into said cylindrical recess with said annular lip snugly seated in said annular recess, mixing means for mixing said spray medium, said mixing means comprising a shaft supported in the bottom of said tank and extending predominantly inside said medium chamber, plug means for selectively closing said connecting channel, and means for interconnecting said plug means and said shaft for closing said connecting channel when said shaft is in an extended position.

3. An inset in accordance with claim 2 wherein said tank bottom has a shaft annular recess surrounding said shaft, and said shaft is formed with a bulge for sealing said shaft annular recess when said shaft is in a withdrawn position.

* * * * *